July 10, 1923.
R. W. MOSER
1,461,067
APPARATUS FOR TREATING SAND AND GRAVEL
Filed March 11, 1922   2 Sheets-Sheet 1
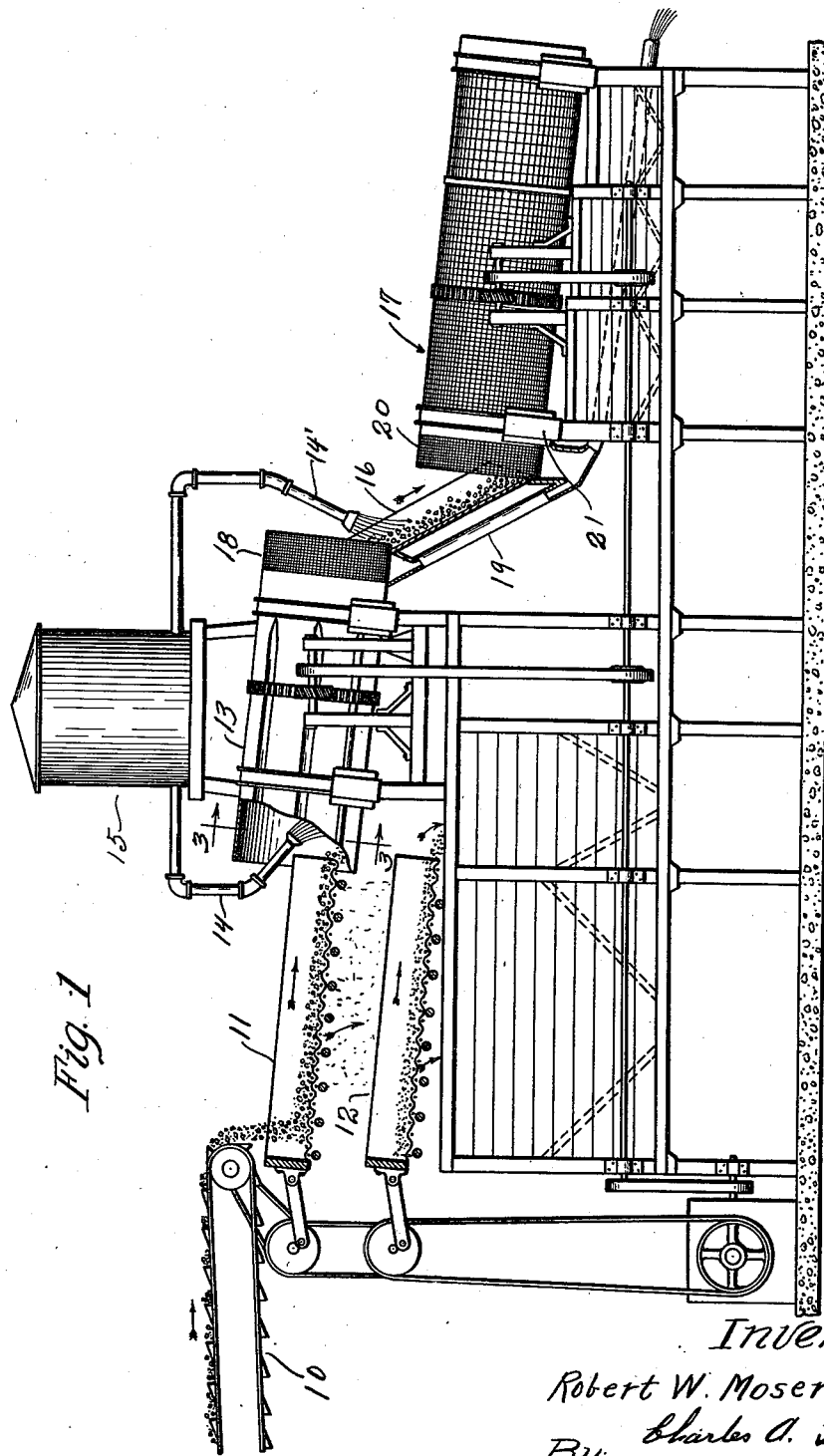
Inventor
Robert W. Moser
By Charles A. Lind
his Attorney

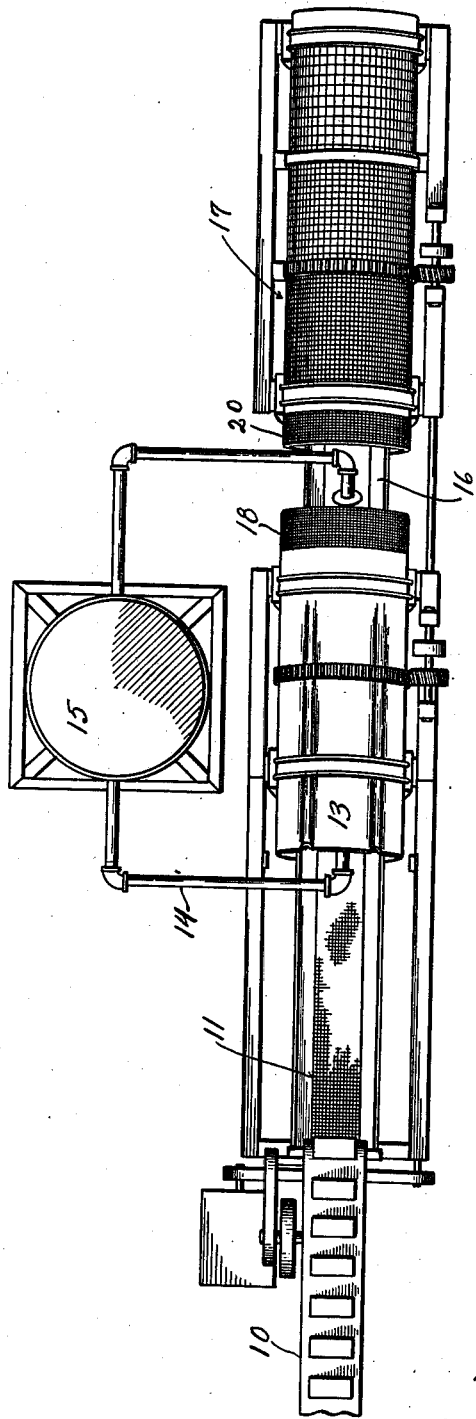
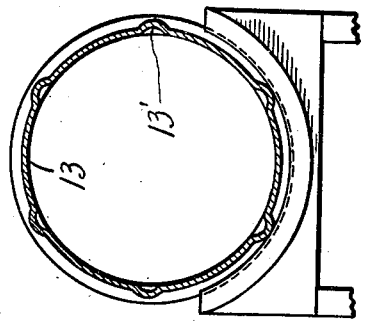

Patented July 10, 1923.

1,461,067

UNITED STATES PATENT OFFICE.

ROBERT W. MOSER, OF ROBBINSDALE, MINNESOTA.

APPARATUS FOR TREATING SAND AND GRAVEL.

Application filed March 11, 1922. Serial No. 542,821.

*To all whom it may concern:*

Be it known that I, ROBERT W. MOSER, a citizen of the United States, residing at Robbinsdale, in the county of Hennepin and State of Minnesota, have invented new and useful Apparatus for Treating Sand and Gravel, of which the following is a specification.

This invention relates to a method and apparatus for treating sand and gravel and has for its object the provision of apparatus for first separating the sand from a sand-and-gravel aggregate and then subsequently washing and grading the gravel.

In apparatus as heretofore constructed the entire sand-and-gravel aggregate has usually been washed and the gravel then separated from the sand. This method of operation, however, is not entirely satisfactory. Particles of wet sand adhere to the gravel thus nullifying in a large measure the reason for washing the gravel, namely, that it shall be clean and free from sand to comply with the demands of building contractors for washed gravel. And inasmuch as bricklayers and plasterers using sand require a dry sand to obtain a thorough mixture with cement, wet sand is, of course, not at all desirable.

The present invention overcomes the objections mentioned by first separating the sand from the gravel and then thoroughly washing the gravel in a novel manner.

The above and other novel features of the invention will appear from the detailed description thereof taken in connection with the accompanying drawings forming part of this specification.

In the drawings, Figure 1 is a side elevation of the preferred form of the invention, parts being broken away and parts being in section, the showing being somewhat diagrammatic; Figure 2 is a plan of the apparatus; and Figure 3 is a cross section on line 3—3 of Figure 1.

10 designates any suitable conveyor for elevating the sand and gravel to position to be dumped on any suitable screen, such as a shaker screen 11 for separating the sand from the gravel. The sand which passes through screen 11 falls on a second screen 12 which grades the sand into at least two sizes. While shaker screens have been shown, it is to be understood that any suitable type of screen may be employed.

The gravel which does not pass through the first screen 11 is discharged therefrom into an agitator or washer 13, preferably of the barrel or cylinder type. Water is conducted into the agitator through a pipe 14 from any suitable source of supply as a tank 15.

As the agitator is rotated the gravel is thoroughly washed and moves toward the lower end of the same and discharges therefrom into a chute 16 which conducts the gravel into a cylinder screen 17.

The agitator 13 at its lower end is provided with a circumferential sieve 18 through which the wash water in the agitator may pass as the gravel passes thereover in leaving the agitator. The wash water discharges into a conduit 19 which discharges at any convenient point thus obviating the sloppy condition usually prevailing around gravel washing apparatus.

Inasmuch as the wash water is drained from the gravel before the latter leaves the agitator, it is comparatively clean and free from water. I prefer, however, to rinse the gravel before grading it and I do this in a novel manner, namely, by spraying the gravel as it passes down the chute 16 in its passage to the grading screen 17, the rinse water conduit being indicated by 14'. The grading screen at its forward end is provided with a circumferential sieve 20 through which the rinsing water may pass thus allowing the gravel to pass on into the screen in a comparatively dry condition for grading.

The agitator is preferably provided with radial pockets 13' to assist in obtaining a more thorough washing of the gravel. The agitator and grading screens may be mounted in any suitable manner as on rollers 21 which cooperate with ring tracks on the agitator and screen.

Any suitable form of drive may be used for the apparatus, that shown being adopted for purposes of illustration.

The present invention enables a clean washed gravel to be obtained free from sand particles and the sand is in a dry state rather than wet as is customary. Furthermore, by separating the sand from the gravel, before washing, a minimum amount of water is used in washing the gravel.

What I claim is:

1. The combination with an inclined chute, of a rotatable gravel washer discharging at the head of the chute, a grading screen at the discharge end of the chute, and means between the washer and screen for directing water toward the chute to rinse the material received thereon from the discharge end of the washer.

2. The combination with an inclined chute, a rotatable gravel washer discharging at the head of the chute, an annular wash-water drain affixed to the discharge end of the washer and constituting an extension thereof, a receiver below said drain at the head of the chute into which the wash-water is received for disposal, and means independent of the washer for directing water toward the chute to rinse the material received thereon from the discharge end of the washer.

3. The combination with an inclined chute, of a rotatable gravel washer discharging at the head of the chute, an annular wash-water drain affixed to the discharge end of the washer and constituting an extension thereof, a receiver below said drain at the head of the chute into which the wash-water is received for disposal, means intermediate the ends of the chute for applying water on the same to rinse the material received thereon from the discharge end of the washer, a water receiver at the lower end of the chute for receiving the wash rinse water, and a grading screen at the discharge end of the chute.

4. The combination with an inclined chute, of a rotatable gravel washer discharging at the head of the chute, a water receiver at the head of the chute adjacent the discharge end of the said washer, a second water receiver at the lower end of the chute for receiving water passing down the said chute, a common conduit connecting the said water receivers and discharging at a point remote from the lower receiver, and means intermediate the ends of the chute for applying water on the same to rinse the material received thereon from the discharge end of the washer.

In testimony whereof, I have hereunto set my hand this 7th day of March, 1922.

ROBERT W. MOSER.